United States Patent
Cutter et al.

(10) Patent No.: US 12,541,977 B2
(45) Date of Patent: Feb. 3, 2026

(54) UNSUPERVISED CUE POINT DISCOVERY FOR EPISODIC CONTENT

(71) Applicant: ROKU, INC., San Jose, CA (US)

(72) Inventors: Michael Cutter, Golden, CO (US);
Rohit Nyayapati, San Jose, CA (US);
Sunil Ramesh, Saratoga, CA (US)

(73) Assignee: Roku, Inc., San Jose, CA (US)

( * ) Notice: Subject to any disclaimer, the term of this patent is extended or adjusted under 35 U.S.C. 154(b) by 261 days.

(21) Appl. No.: 18/205,802

(22) Filed: Jun. 5, 2023

(65) Prior Publication Data
US 2024/0404285 A1 Dec. 5, 2024

(51) Int. Cl.
*G06V 20/40* (2022.01)
*G06V 10/74* (2022.01)
*G06V 10/75* (2022.01)
*G06V 20/62* (2022.01)

(52) U.S. Cl.
CPC ........... *G06V 20/49* (2022.01); *G06V 10/751* (2022.01); *G06V 10/761* (2022.01); *G06V 20/63* (2022.01)

(58) Field of Classification Search
CPC .... G06V 20/49; G06V 10/751; G06V 10/761; G06V 20/63; G06V 20/41; G06V 20/635; H04N 21/23418; H04N 21/26603; H04N 21/8455; H04N 21/8456
See application file for complete search history.

(56) References Cited

U.S. PATENT DOCUMENTS

| | | | | |
|---|---|---|---|---|
| 5,717,438 A | * | 2/1998 | Kim | G11B 27/034 715/251 |
| 8,032,507 B1 | * | 10/2011 | Bayardo | G06F 16/3347 707/706 |
| 8,386,400 B2 | * | 2/2013 | Raichelgauz | G06F 40/134 706/12 |
| 10,452,919 B2 | * | 10/2019 | Kansara | G11B 27/005 |
| 11,606,591 B1 | * | 3/2023 | Grover | H04N 21/8456 |
| 2005/0089224 A1 | * | 4/2005 | Aoki | G06V 20/40 348/700 |
| 2005/0183016 A1 | * | 8/2005 | Horiuchi | G11B 27/107 386/241 |

(Continued)

OTHER PUBLICATIONS

Chen, Shixing, et al., "Shot Contrastive Self-Supervised Learning for Scene Boundary Detection", 2021 IEEE/CVF Conference on Computer Vision and Pattern Recognition (CVPR), IEEE, XP034008747, Jun. 20, 2021, pp. 9791-9800.

(Continued)

*Primary Examiner* — Solomon G Bezuayehu
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for cue point discovery for content. For example, system, apparatus, article of manufacture, method and/or computer program product embodiments, and/or combinations and sub-combinations thereof are provided for using unsupervised machine learning to automatically classify cue points for episodic content. The cue points can be associates with an opening credits section, an end credits section, a recap section, or a behind-the-scenes section.

20 Claims, 5 Drawing Sheets

(56) References Cited

U.S. PATENT DOCUMENTS

| | | | | |
|---|---|---|---|---|
| 2007/0296863 | A1* | 12/2007 | Hwang | G06F 16/784 |
| | | | | 348/563 |
| 2009/0154806 | A1* | 6/2009 | Chang | G06V 20/48 |
| | | | | 382/173 |
| 2010/0048461 | A1* | 2/2010 | Saragovi | A61P 43/00 |
| | | | | 514/1.1 |
| 2011/0225196 | A1* | 9/2011 | Haseyama | G06F 16/70 |
| | | | | 707/E17.03 |
| 2012/0076357 | A1* | 3/2012 | Yamamoto | H04N 21/8549 |
| | | | | 382/103 |
| 2013/0156321 | A1* | 6/2013 | Motoi | G06V 20/47 |
| | | | | 382/190 |
| 2013/0276033 | A1 | 10/2013 | Francini et al. | |
| 2014/0160352 | A1* | 6/2014 | Chen | G11B 27/28 |
| | | | | 348/515 |
| 2015/0229867 | A1* | 8/2015 | Jojic | H04N 21/4334 |
| | | | | 348/468 |
| 2015/0312647 | A1* | 10/2015 | Abramson | H04N 21/23418 |
| | | | | 725/19 |
| 2016/0247328 | A1* | 8/2016 | Han | H04N 21/8549 |
| 2017/0208348 | A1* | 7/2017 | Cheng | H04N 21/84 |
| 2017/0309296 | A1* | 10/2017 | Sun | H04N 21/44008 |
| 2018/0132011 | A1* | 5/2018 | Shichman | H04N 21/233 |
| 2018/0150469 | A1* | 5/2018 | Wang | G06F 16/738 |
| 2018/0152743 | A1* | 5/2018 | Wood | H04N 21/252 |
| 2018/0174600 | A1* | 6/2018 | Chaudhuri | H04N 21/44008 |
| 2019/0028525 | A1* | 1/2019 | Kansara | H04L 65/765 |
| 2019/0108401 | A1* | 4/2019 | Chen | G06V 20/41 |
| 2020/0134316 | A1* | 4/2020 | Krishnamurthy | G06N 3/09 |
| 2020/0401808 | A1* | 12/2020 | Wu | G06V 10/7784 |
| 2021/0256366 | A1* | 8/2021 | Zhao | G06N 3/08 |
| 2021/0295056 | A1* | 9/2021 | Zhang | G06F 18/22 |
| 2021/0321168 | A1* | 10/2021 | Ganuthula | H04N 21/26603 |
| 2022/0019809 | A1* | 1/2022 | Younessian | G06N 20/00 |
| 2022/0321551 | A1* | 10/2022 | Mack | H04L 9/3226 |
| 2023/0009336 | A1* | 1/2023 | Tang | H04N 21/234 |
| 2023/0049135 | A1* | 2/2023 | Su | G06V 20/49 |
| 2023/0092847 | A1* | 3/2023 | Narayan | H04N 21/8456 |
| | | | | 386/241 |
| 2023/0105830 | A1* | 4/2023 | Weisman | G06Q 50/01 |
| | | | | 707/706 |
| 2023/0154184 | A1* | 5/2023 | Frost | H04N 21/23418 |
| | | | | 382/100 |
| 2025/0166055 | A1* | 5/2025 | Tarquini | G06Q 40/08 |

OTHER PUBLICATIONS

Office Action for Canadian Application No. 3240365, mailed on Jul. 31, 2025, 4 Pages.

* cited by examiner

UNSUPERVISED CUE POINT DISCOVERY FOR EPISODIC CONTENT

BACKGROUND

Field

This disclosure is generally directed to methods and systems for cue point discovery for content, and more particularly to methods and systems for using unsupervised machine learning to automatically classify cue points for episodic content.

Background

Content, such as a TV show, can include multiple episodes in a season. Each episode of the content can be annotated with cue points to indicate sections of the content such as opening credits and/or the end credits. The cue points can indicate when the opening credits and/or the end credits occur.

SUMMARY

Provided herein are system, apparatus, article of manufacture, method and/or computer program product embodiments, and/or combinations and sub-combinations thereof, for cue point discovery for content. For example, system, apparatus, article of manufacture, method and/or computer program product embodiments, and/or combinations and sub-combinations thereof are provided for using unsupervised machine learning to automatically classify cue points for episodic content.

According to some embodiments, the video sequence belonging to start credits section, recap section, end credits section, and/or behind-the-scenes section can be largely repeated between episodes of an episodic content (e.g., the episode in the same season). Using unsupervised machine learning to automatically classify cue points within all episodes in the season can be a computationally efficient way to perform cue point discovery for content. As discussed in more detail below, the unsupervised machine learning methods of this disclosure can be used to determine repeated information between different episodes of the episodic content. The determined repeated information can be used to determine different sections of each episode and to automatically classify cue points. By using the determined cue points, the user experience can be improved. For example, a user watching an episode of the episodic content, can skip different sections of the episode using the determined cue points. As another example, the determined cue point for the end credits section can be used to, for example, minimize the viewing presentation of the episode being shown and showing recommendations in addition to the minimized viewing presentation of the episode.

However, it is noted the embodiments of this disclosure are not limited to these examples, and other methods can be used to enhance the user experience using the determined cue points.

An example embodiment operates by a computer-implemented method. The method includes dividing, by at least one computer processor, a video associated with an episode of an episodic content into a plurality of sections. The method further includes determining a representation for each of the plurality of sections. The method also includes comparing a first representation associated with a first section of the plurality of sections of the video with a plurality of representations. The plurality of representations are associated with one or more sections of one or more episodes of the episodic content. The method further includes determining a plurality of similarity values for the first representation based on the comparison and determining one or more of the plurality of similarity values that satisfy a condition. The method also includes determining a temporal position associated with the first representation in response to the one or more of the plurality of similarity values satisfying the condition. The method further includes using the temporal position associated with the first representation to determine a type of the first section of the plurality of sections of the video associated with the first representation.

In some embodiments, the representation includes an image embedding, an audio embedding, a text embedding (e.g., closed captioning), or a combination of two or more of the image embedding, the audio embedding, and the text embedding. In some embodiments, the type of the first section includes an opening credits section, an end credits section, a recap section, or a behind-the-scenes section.

In some embodiments, using the temporal position associated with the first representation to determine the type of the first section can include comparing the temporal position with a first temporal position threshold and determining that the type of the first section is the opening credits section in response to the temporal position being before the first temporal position threshold.

In some embodiments, using the temporal position associated with the first representation to determine the type of the first section can include comparing the temporal position with a second temporal position threshold and determining that the type of the first section is the end credits section in response to the temporal position being after the second temporal position threshold.

In some embodiments, using the temporal position associated with the first representation to determine the type of the first section can include comparing the temporal position with a first temporal position threshold and a second temporal position threshold. The method further include determining that the type of the first section is the opening credits section in response to the temporal position being before the first temporal position threshold and determining that the type of the first section is the end credits section in response to the temporal position being after the second temporal position threshold.

In some embodiments, determining the type of the first section further can include using a text detection method to determine text within the first section of the plurality of sections of the video and using the determined text to determine that the type of the first section is the end credits section.

In some embodiments, determining the type of the first section further can include using at least one or more of first region information associated with a first region where the episodic content is produced, second region information associated with a second region where the episodic content is being shown, or production information associated with the episodic content to determine the type of the first section.

In some embodiments, determining one or more of the plurality of similarity values that satisfy the condition can include comparing the plurality of similarity values with a threshold and determining that the one or more of the plurality of similarity values are greater than the threshold.

In some embodiments, determining the representation, comparing the first representation with the plurality of representations, determining the plurality of similarity values, and determining the one or more of the plurality of similarity values satisfying the condition are part of an unsupervised machine learning model.

In some embodiments, the method further incudes determining two or more sections of the plurality of sections of the video that have similarity values that satisfy the condition. The method also includes determining a number of the two or more sections and in response to the number of the two or more sections satisfy a second threshold, using temporal positions associated with the two or more sections to determine a type of the two or more sections of the plurality of sections of the video.

An example embodiment operates by a system including one or more memories and at least one processor each coupled to at least one of the memories. The at least one processor is configured to perform operations including dividing a video associated with an episode of an episodic content into a plurality of sections. The operations further include determining a representation for each of the plurality of sections. The operations further include comparing a first representation associated with a first section of the plurality of sections of the video with a plurality of representations. The plurality of representations are associated with one or more sections of one or more episodes of the episodic content. The operations further include determining a plurality of similarity values for the first representation based on the comparison and determining one or more of the plurality of similarity values that satisfy a condition. The operations further include determining a temporal position associated with the first representation in response to the one or more of the plurality of similarity values satisfying the condition. The operations further include using the temporal position associated with the first representation to determine a type of the first section of the plurality of sections of the video associated with the first representation.

An example embodiment operates by a non-transitory computer-readable medium having instructions stored thereon that, when executed by at least one computing device, cause the at least one computing device to perform operations. The operations can include dividing a video associated with an episode of an episodic content into a plurality of sections. The operations further include determining a representation for each of the plurality of sections. The operations further include comparing a first representation associated with a first section of the plurality of sections of the video with a plurality of representations. The plurality of representations are associated with one or more sections of one or more episodes of the episodic content. The operations further include determining a plurality of similarity values for the first representation based on the comparison and determining one or more of the plurality of similarity values that satisfy a condition. The operations further include determining a temporal position associated with the first representation in response to the one or more of the plurality of similarity values satisfying the condition. The operations further include using the temporal position associated with the first representation to determine a type of the first section of the plurality of sections of the video associated with the first representation. The type of the first section can include an opening credits section, an end credits section, a recap section, or a behind-the-scenes section.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for cue point discovery for content.

Figure 1:
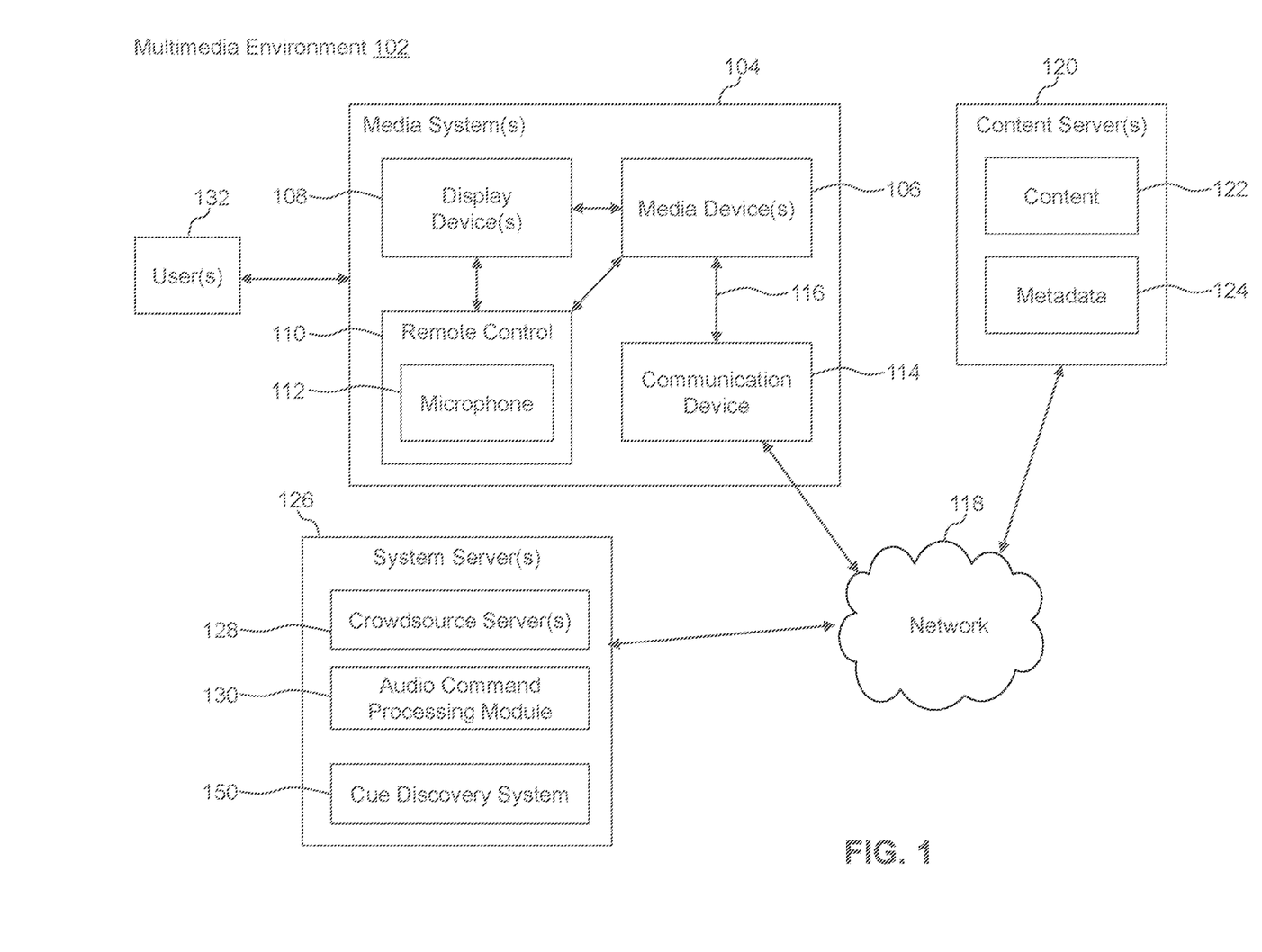
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, where the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
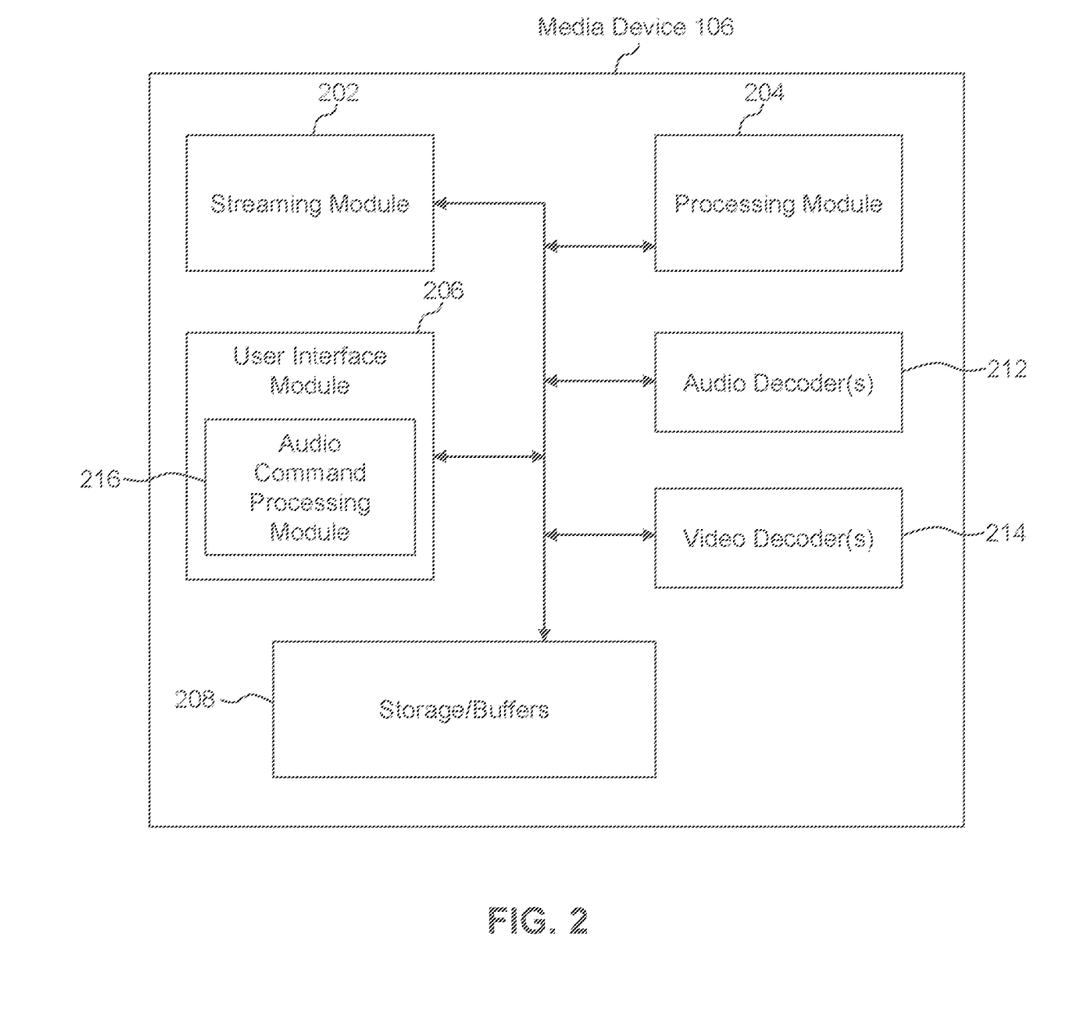
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

In some embodiments, the system servers 126 may also include cue discovery system 150. The cue discovery system 150 may be configured to perform cue point discovery for content. For example, the cue discovery system 150 may be configured to use unsupervised machine learning to automatically classify cue points for episodic content. The structural and functional aspects of the cue discovery system 150 may wholly or partially exist in the same or different ones of the system servers 126. Additionally, or alternatively, the structural and functional aspects of the cue discovery system 150 may exist in the media devices 106, the content servers 120, or a combination thereof. Additionally, or alternatively, the structural and functional aspects of the cue discovery system 150 may exist as a separate entity.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Cue Discovery System

Figure 3:
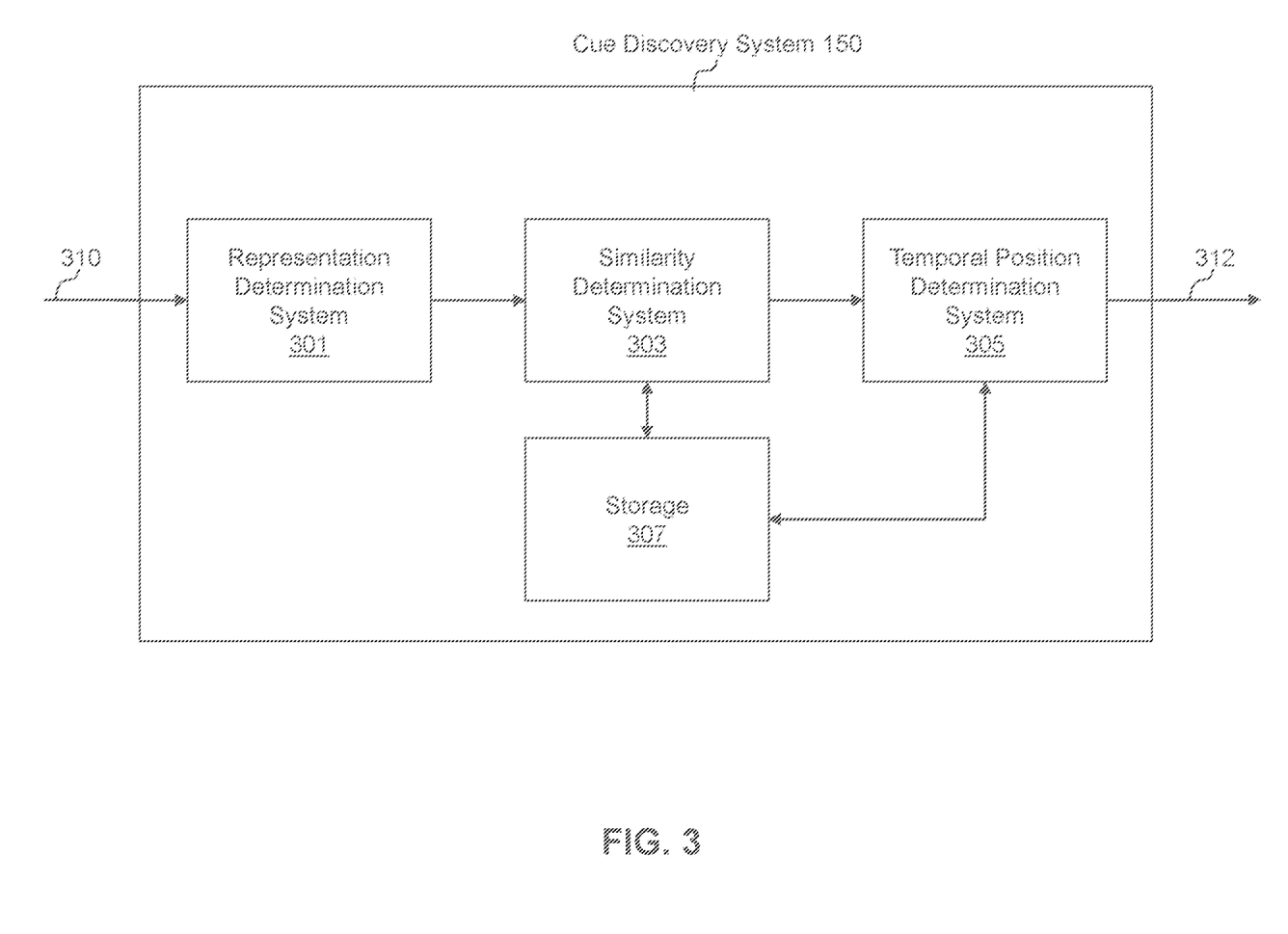
FIG. 3 illustrates a block diagram of an example cue discovery system, according to some embodiments.

FIG. 3 illustrates a block diagram of an example cue discovery system 150, according to some embodiments. According to some embodiments, the cue discovery system 150 can include a representation determination system 301, a similarity determination system 303, a temporal determination system 305, and a storage 307. However, the aspects of this disclosure are not limited to these examples, and the cue discovery system 150 can include other systems and/or modules. Also, although the representation determination system 301, the similarity determination system 303, and the temporal determination system 305 are illustrated as separate systems and/or modules, the components of these systems can be combined in one or more systems and/or modules. Also, the storage 307 can be part of the cue discovery system 150, can be part of the system servers 126, the media systems 104, and/or the content servers 120. Additionally, or alternatively, storage 307 can be a separate storage device coupled to the cue discovery system 150, can be part of the system servers 126, the media systems 104, and/or the content servers 120.

According to some embodiments, the cue discovery system 150 can receive video 310. The video 310 can be an episode of an episodic content. According to some embodiments, the episodic content includes a content having one or more episodes. For example, the episodic content can include one or more seasons and each season of the episodic content can include one or more episodes. The episodic content can include any type of shows with one or more episodes. According to some embodiments, each episode of the episodic content can include one or more of an opening credits section, a recap section, an end credits section, and/or a behind-the-scenes section.

The opening credits section can include an opening section of each episode. All or part of the opening credits section can be shared (e.g., be the same or substantially the same) between the episodes of each season of the episodic content. Additionally, or alternatively, all or part of the opening credits section can be shared (e.g., be the same or substantially the same) between the episodes of one or more seasons of the episodic content.

The end credits section can include an end section of each episode. All or part of the end credits section can be shared (e.g., be the same or substantially the same) between the episodes of each season of the episodic content. Additionally, or alternatively, all or part of the end credits section can be shared (e.g., be the same or substantially the same) between the episodes of one or more seasons of the episodic content.

The recap section can include a section of each episode that summaries one or more previous episodes of the episodic content. All or part of the recap section can be shared (e.g., be the same or substantially the same) between the episodes of each season of the episodic content. Additionally, or alternatively, all or part of the recap section can be shared (e.g., be the same or substantially the same) between the episodes of one or more seasons of the episodic content.

The behind-the-scenes section can include a section of each episode that provided behind-the-scenes of one or more episodes of the episodic content. All or part of the behind-the-scenes section can be shared (e.g., be the same or substantially the same) between the episodes of each season of the episodic content. Additionally, or alternatively, all or part of the behind-the-scenes section can be shared (e.g., be the same or substantially the same) between the episodes of one or more seasons of the episodic content After receiving the video 310, the cue discovery system 150 can divide the video 310 into one or more sections. For example, the representation determination system 301 can be configured to divide the video 310 into one or more (e.g., a plurality of) sections. In some embodiments, each section can include one or more video frame. For example, the representation determination system 301 can divide the video 310 into a plurality of video frames where each section of the video 310 can include one video frame. Additionally, or alternatively, the representation determination system 301 can divide the video 310 into a plurality of shots where each section of the video 310 can include one shot and where each shot includes two or more video frames.

The representation determination system 301 can further be configured to determine a representation for each section of the video 310. According to some embodiments, the representation for each section can include an image representation. For example, the image representation can include a visual (e.g., an image) embedding. Additionally, or alternatively, the representation for each section can include an audio representation. For example, the audio representation can include an audio embedding. Additionally, or alternatively, the representation for each section can include a text representation. For example, the text representation can include a text embedding such as, but not limited to, closed captioning. Additionally, or alternatively, the representation for each section can include a combination of a visual representation and an audio representation. For example, the combination of the visual representation and the audio representation can include a combination of an image embedding and an audio embedding. Additionally, or alternatively, the representation for each section can include a combination of a visual representation and a text representation. For example, the combination of the visual representation and the text representation can include a combination of an image embedding and a text embedding. Additionally, or alternatively, the representation for each section can include a combination of an audio representation and a text representation. For example, the combination of the audio representation and the text representation can include a combination of an audio embedding and a text embedding. Additionally, or alternatively, the representation for each section can include a combination of a visual representation, an audio representation, and a text representation. For example, the combination of the visual representation, the audio representation, and the text representation can include a combination of an image embedding, an audio embedding, and a text embedding.

According to some embodiments, the representation determination system 301 can use different methods to determine the representations for the sections of the video 310. In a non-limiting example, the representation determination system 301 can apply a video features extraction method to each section of the video 310 to determine a video matrix associated with that section. The representation determination system 301 can further convert the video matrix to a video vector. The representation determination system 301 can use the video vector as the representation for that section of the video 310.

Additionally, or alternatively, the representation determination system 301 can apply an audio features extraction method to each section of the video 310 to determine an audio matrix associated with that section. The representation determination system 301 can further convert the audio matrix to an audio vector. The representation determination system 301 can use the audio vector as the representation for that section of the video 310.

Additionally, or alternatively, the representation determination system 301 can apply a video/audio features extraction method to each section of the video 310 to determine a video/audio matrix associated with that section. The representation determination system 301 can further convert the video/audio matrix to a video/audio vector. The representation determination system 301 can use the video/audio vector as the representation for that section of the video 310.

However, the aspects of this disclosure are not limited to these examples, and the representation determination system 301 can use other methods to determine a representation for each section of the video 310. For example, the representation determination system 301 can apply one or more machine learning models to determine the representation for each section of the video 310. In some embodiments, the representation determination system 301 can be configured to apply a deep learning encoder to each section of the video 310 to determine the representation of that section of the video 310. For example, the representation determination system 301 can apply the deep learning encoder to each section of the video 310 to determine a dense feature vector (or a dense vector) as the a representation for each section of the video 310.

According to some embodiments, the one or more determined representations for the one or more sections of the video 310 are analyzed by the similarity determination system 303. The similarity determination system 303 can be configured to determine, for each determined representation, similar representations in other episodes of the episodic content. According to some embodiments, determined representations for different sections of other episodes of the episodic content can be stored in storage 307.

After receiving the determined representation from the representation determination system 301, the similarity determination system 303 can determine which episodic content the determined representation belong to. For example, the similarity determination system 303 can use metadata associated with the determined representation to determine the episodic content. Based on the determined episodic content, the similarity determination system 303 can determine the stored plurality of representations associated with the determine episodic content. According to some embodiments, the stored plurality of representations are associated with different sections of different episodes of the episodic content.

According to some embodiments, the similarity determination system 303 is configured to compare the determined representation (determined by representation determination system 301) with the stored plurality of representations. Although some embodiments of this disclosure are discussed with respect to comparing the determined representation with the stored plurality of representations, the embodiments of this disclosure are not limited to these examples and can include comparing each frame of the video 310 with stored frames and/or can include applying pixel by pixel comparison.

Based on the comparison of the determined representation with the stored plurality of representations, the similarity determination system 303 can determine a plurality of similarity values for the determined representation of the section of the video 310. According to some embodiments, the similarity determination system 303 can apply different methods for determining the plurality of similarity values. For example, the similarity determination system 303 can a apply similarity algorithm to determine a plurality of similarity values for the determined representation of the section of the video 310. The similarity algorithm can include, but is not limited to, one or more of cosine similarity, temporal similarity matrix, dynamic time warping, dynamic program algorithm, an algorithm to use temporal information of the similarities, earth movers distance, or the like.

As discussed above, each section of the video 310 is being compared with one or more sections of one or more episodes of the episodic content. Therefore, the similarity determination system 303 is configured to determine a plurality of similarity values associated with each section of the video 310. The plurality of similarity values can indicate how similar that section of the video 310 is comparted to the one or more sections of one or more episodes of the episodic content that stored in storage 307.

After determining the plurality of similarity values, the similarity determination system 303 is configured to determine one or more of the plurality of similarity values that satisfy a condition. For example, the similarity determination system 303 is configured to compare the plurality of similarity values with a threshold to determine the one or more of the plurality of similarity values that satisfy the condition. In some examples, if the one or more of the plurality of similarity values are greater than the threshold, then the similarity determination system 303 can determine that the one or more of the plurality of similarity values that satisfy the condition. By determining the one or more of the plurality of similarity values that satisfy the condition, the similarity determination system 303 is configured to determine one or more sections of one or more episodes that are similar to the section of the video 310 that is being analyzed.

According to some embodiments the threshold (and/or other conditions used for determining the one or more of the plurality of similarity values that satisfy the condition) can be stored in storage 307.

After determining the one or more of the plurality of similarity values that satisfy the condition (e.g., determining one or more sections of one or more episodes that are similar to the section of the video 310), the temporal position determination system 305 can determine a temporal position of the section of the video 310 that is being analyzed. Using the determined temporal position of the section of the video 310 that is being analyzed, the temporal position determination system 305 can determine the type of the section of the video 310 that is being analyzed. For example, the temporal position determination system 305 can determine whether the section of the video 310 that is being analyzed is an opening credits section, an end credits section, a recap section, or a behind-the-scenes section.

According to some embodiments, the temporal position determination system 305 can determine the temporal position of the section of the video 310 that is being analyzed by determining the position of that section within the video 310. In some examples, after determining the temporal position of the section of the video 310, the temporal position determination system 305 can compare the temporal position with one or more temporal position thresholds.

According to some embodiments, after determining the temporal position of the section of the video 310, the temporal position determination system 305 can compare the temporal position with a first temporal position threshold. The temporal position determination system 305 can determine that the type of the section is the opening credits section in response to the temporal position being before the first temporal position threshold. In some examples, the first temporal position threshold can be around 40% of the duration of video 310. In some examples, the first temporal position threshold can be around 30% of the duration of video 310. In some examples, the first temporal position threshold can be around 20% of the duration of video 310. In some examples, the first temporal position threshold can be around 15% of the duration of video 310. In some examples, the first temporal position threshold can be around 10% of the duration of video 310. In some examples, the first temporal position threshold can be around 5% of the duration of video 310. However, the embodiments of this closure can include other values for the first temporal position threshold.

According to some embodiments, after determining the temporal position of the section of the video 310, the temporal position determination system 305 can compare the temporal position with a second temporal position threshold. The temporal position determination system 305 can determine that the type of the section is the end credits section in response to the temporal position being after the second temporal position threshold. In some examples, the second temporal position threshold can be around 60% of the duration of video 310. In some examples, the second temporal position threshold can be around 70% of the duration of video 310. In some examples, the second temporal position threshold can be around 80% of the duration of video 310. In some examples, the second temporal position threshold can be around 85% of the duration of video 310. In some examples, the second temporal position threshold can be around 90% of the duration of video 310. In some examples, the second temporal position threshold can be around 95% of the duration of video 310. However, the embodiments of this closure can include other values for the second temporal position threshold.

According to some embodiments, the first temporal position threshold and/or the second temporal position threshold can be stored in storage 307.

According to some embodiments, after determining the temporal position of the section of the video 310, the temporal position determination system 305 can also determine one or more temporal positions associated with one or more video sections that the similarity determination system 303 found to be similar to the section of the video 310.

According to some embodiments, the temporal positions associated with the video sections of different episodes of the episodic content can also be stored in, for example, storage 307. The temporal position determination system 305 can use the temporal position of the section of the video 310 and the one or more temporal positions associated with the one or more video sections to determine whether the section of video 310 is a recap section. In a non-limiting example, if the temporal position of the section of the video 310 is located "close" to the start of the video 310 and the one or more temporal positions associated with the one or more video sections are associated with different episodes and/or are located at different locations within one or more episodes, the similarity determination system 303 can classify the section of the video 310 as the recap section. In some embodiments, the temporal position determination system 305 can determine that the temporal position of the section of the video 310 is located "close" to the start of the video 310 in response to the temporal position being before the first temporal position threshold discussed above.

According to some embodiments, the cue discovery system 150 (e.g., using the temporal position determination system 305) can use one or more other parameters to determine the type of the section of the video 310 that is being analyzed. For example, in addition to, or alternatively to, using the determined temporal position, the temporal position determination system 305 can use at least one or more of region information associated with a region where the episodic content is produced, region information associated with a region where the episodic content is being shown, or production information associated with the episodic content to determine the type of the section of the video 310 that is being analyzed.

According to some embodiments, the first temporal position threshold and/or the second temporal position threshold can depend on the region information associated with the region where the episodic content is produced, the region information associated with the region where the episodic content is being shown, the production information associated with the episodic content, the duration of the episodes of the episodic content, or the like. In these examples, the temporal position determination system 305 can determine additional information associated with the video 310 and use the additional information to choose the corresponding first temporal position threshold and/or the corresponding second temporal position threshold.

According to some embodiments, the cue discovery system 150 (e.g., using the temporal position determination system 305) can use one or more other parameters to determine the type of the section of the video 310 that is being analyzed. For example, the temporal position determination system 305 can use a text detection method for determining text within the section of the video 310 that is being analyzed. The text detection method can include a text detection machine learning model. By detecting the text within the section of the video 310, the temporal position determination system 305 can be configured to determine whether the section of the video 310 is part of the end credits section that includes the end credit text.

The temporal position determination system 305 can use other information (in addition to, or alternatively to, using the determined temporal position) to determine the type of the section of the video 310 that is being analyzed. For example, the temporal position determination system 305 can use information associated with durations of credits sections to determine the type of the section of the video 310 that is being analyzed. For example, each of opening credits section, end credits section, recap section, behind-the-scenes section can have associated durations. These durations can be episodic content specific and/or can have similar values over different episodic contents. In some embodiments, the temporal position determination system 305 can use other information associated with the credits sections to determine the type of the section of the video 310 that is being analyzed. The other information associated with the credits sections can include, but are not limited to, start temporal positional information and/or end temporal positional information associated with opening credits section, end credits section, recap section, and/or behind-the-scenes section.

The cue discovery system 150 can perform the method discussed above on all sections of the video 310. In other words, after the video 310 is divided into one or more sections, the cue discovery system 150 can perform the method discussed above on the one or more sections of the video 310.

After determining the type of the section of the video 310 that is being analyzed, the determined type can be added to its corresponding section. For example, the determined type can be added to its corresponding section as metadata. For example, the determined type can be added to its corresponding section as a flag. Other methods can be used to add the determined type to its corresponding section. If no type is determined, no additional information is added to the corresponding section. Video 312 can include flagged video sections. The video 312 can be sent to, for example, content servers 120, the media systems 140, or the like. The video 312 that can include flagged video sections can enhance the user 132 experience as discussed above.

According to some embodiments, one or more of representation determination system 301, similarity determination system 303, or temporal position determination system 305 are part of an unsupervised machine learning model. In other words, the cue discovery system 150 can perform one or more of unsupervised machine learning model to determine the types(s) of different sections of video 310. According to some embodiments, the methods discussed in this disclosure can be used to train the unsupervised machine learning model of the cue discovery system 150. According to some embodiments, the methods discussed in this disclosure can be used by the unsupervised machine learning model of the cue discovery system 150 to classify different sections of the video 310.

Figure 4:
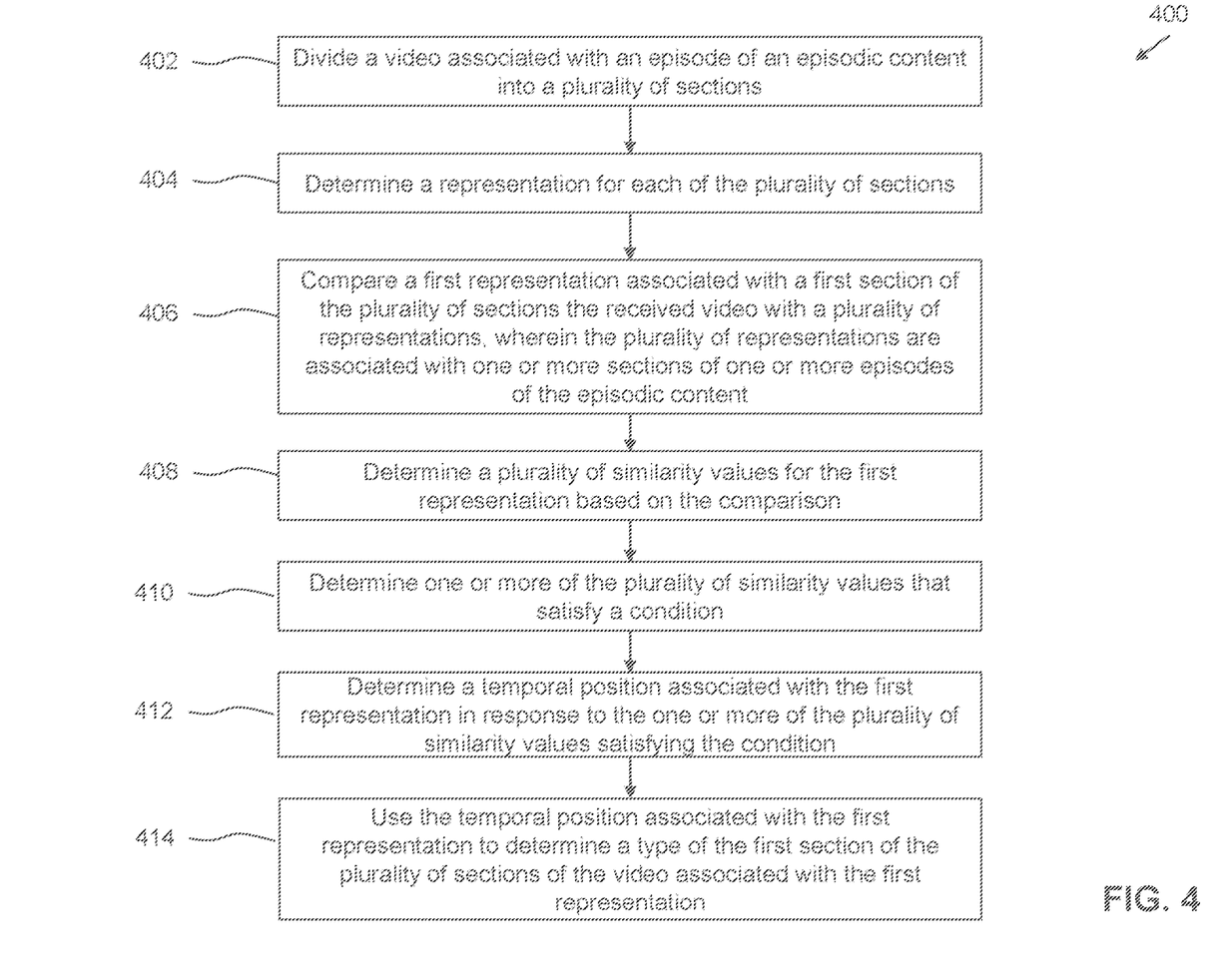
FIG. 4 is a flowchart for a method for cue point discovery for content, according to an embodiment.

FIG. 4 is a flowchart for a method 400 for cue point discovery for content, according to an embodiment. Method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 3. However, method 400 is not limited to that example embodiment.

At 402, a video associated with an episode of an episodic content is divided into a plurality of sections. For example, the cue discovery system 150 can receive the video (e.g., the video 310) associated with an episode of the episodic content and the cue discovery system 150 can divide the video into a plurality of sections. In some embodiments, each section can include one or more video frame. For example, the cue discovery system 150 (e.g., using the representation determination system 301) can divide the video into a plurality of video frames where each section of the video 310 can include one video frame. Additionally, or alternatively, the cue discovery system 150 (e.g., using the representation determination system 301) can divide the video into a plurality of shots where each section of the video can include one shot and where each shot includes two or more video frames. However, the embodiments of this disclosure are not limited to these examples and each section of the video can include other exemplary portions of the received video of the episode of the episodic content.

At 404, a representation for a section of the plurality of sections is determined. For example, the cue discovery system 150 can determine a representation for a section of the plurality of sections. The cue discovery system 150 can determine a representation for each section of the plurality of sections. Additionally, or alternatively, the cue discovery system 150 can determine representations for some (but not all) sections of the plurality of sections. In some embodiments, the representation can include an image embedding, an audio embedding, a text embedding (e.g., closed captioning), or a combination of two or more of the image embedding, the audio embedding, and the text embedding. However, the embodiments of this disclosure are not limited to these examples, and the cue discovery system 150 can determine other representations for the video sections.

At 406, a first representation associated with a first section of the plurality of sections the received video is compared with a plurality of representations. For example, the cue discovery system 150 can compare the first representation associated with the first section of the plurality of sections the received video with the plurality of representations. The plurality of representations can be associated with one or more sections of one or more episodes of the episodic content. The plurality of representations can be stored in storage 307, according to some embodiments.

At 408, a plurality of similarity values for the first representation is determined based on the comparison at 406. For example, the cue discovery system 150 can determine the plurality of similarity values for the first representation based on the comparison at 406. According to some embodiments, the number of similarity values can be equal to the number of the plurality of representations used for the comparison to the first representation.

At 410, one or more of the plurality of similarity values are determined that satisfy a condition. For example, the cue discovery system 150 can determine one or more of the plurality of similarity values that satisfy the condition. According to some embodiments, determining the one or more of the plurality of similarity values that satisfy the condition can include using a similarity threshold. For example, the cue discovery system 150 can compare the plurality of similarity values determined at 408 with the similarity threshold. The cue discovery system 150 can then determine that the one or more of the plurality of similarity values are greater than the similarity threshold and therefore, the one or more of the plurality of similarity values satisfy the condition. The cue discovery system 150 can use other method for determining that the one or more of the plurality of similarity values satisfy the condition.

At 412, a temporal position associated with the first representation is determined. For example, the cue discovery system 150 can determine the temporal position associated with the first representation. According to some embodiments, the temporal position associated with the first representation is determined in response to the one or more of the plurality of similarity values satisfying the condition.

According to some embodiments, 412 can further include determining additional temporal positions. The additional temporal positions are associated with the video sections that their corresponding representations resulted in the one or more of the plurality of similarity values that satisfied the condition. In other words, the additional temporal positions are associated with the stored video sections that are similar to the first section of the received video.

At 414, the temporal position associated with the first representation is used to determine a type of the first section of the plurality of sections of the video associated with the first representation. For example, the cue discovery system 150 can use the temporal position associated with the first representation to determine the type of the first section of the plurality of sections of the video. Additionally, or alternatively, the cue discovery system 150 can use the temporal position associated with the first representation and the additional temporal positions determined at 412 to determine the type of the first section of the plurality of sections of the video.

According to some embodiments, the type of the first section can include one or more the opening credits section, the end credits section, the recap section, and/or the behind-the-scenes section. The type of the first section can include other sections of an episode of an episodic content.

According to some embodiments, using the temporal position associated with the first representation to determine the type of the first section can include comparing the temporal position with a first temporal position threshold and determining the type of the first section is the opening credits section in response to the temporal position being before (and/or within) the first temporal position threshold.

According to some embodiments, using the temporal position associated with the first representation to determine the type of the first section can include comparing the temporal position with a second temporal position threshold and determining that the type of the second section is the end credits section in response to the temporal position being after (and/or within) the second temporal position threshold.

According to some embodiments, using the temporal position associated with the first representation to determine the type of the first section can include comparing the temporal position with a first temporal position threshold and a second temporal position threshold. The type of the first section is determined to be the opening credits section in response to the temporal position being before (and/or within) the first temporal position threshold. The type of the first section is determined to be the end credits section in response to the temporal position being after (and/or within) the second temporal position threshold.

According to some embodiments, if the determined temporal position of the first section is located "close" to the start of the received video, and the additional temporal positions are associated with different episodes and/or are located at different locations within one or more episodes, the cue discovery system 150 can classify the first section of the video as the recap section.

Method 414 can use other information (in addition to, or alternatively to, using the determined temporal position and/or the additional temporal positions) to determine the type of the section of the video that is being analyzed. In some embodiments, determining the type of the first section further can include using a text detection method to determine text within the first section of the plurality of sections of the video and using the determined text to determine that the type of the first section is the end credits section. In some embodiments, determining the type of the first section can include using at least one or more of region information associated with a region where the episodic content is produced, region information associated with a region where the episodic content is being shown, production information associated with the episodic content, or the like.

According to some embodiments, the method 400 can determine the type of a section of the received video after a number of the sections of the plurality of sections that satisfy the condition in 410 have satisfied a second condition. For example, the method 400 can repeat 402-410 until a number of the sections of the plurality of sections that satisfy the condition in 410 have satisfied the second condition. In other words, the cue discovery system 150 would classify the sections of the received video after a given number of the sections have satisfied the condition in 410. According to some embodiments, the method 400 can further include determining two or more sections of the plurality of sections of the received video that have similarity values that satisfy the condition, determining a number of the two or more sections, and in response to the number of the two or more sections satisfy the second condition, using temporal positions associated with the two or more sections to determine a type of the two or more sections of the plurality of sections of the received video. The second condition can include a quantity threshold, and the type of the two or more sections of the plurality of sections of the received video is determined in response to the number of the two or more sections is greater than the quantity threshold.

According to some embodiments, the method 400 can be repeated each one of the plurality of sections of the video that was determined at 402.

According to some embodiments, the method 400 can be performed using an unsupervised machine learning model. According to some embodiments, the method 400 can be used to train the unsupervised machine learning model of the cue discovery system 150. According to some embodiments, the method 400 can be used by the unsupervised machine learning model of the cue discovery system 150 to classify different sections of the video 310.

Example Computer System

Figure 5:
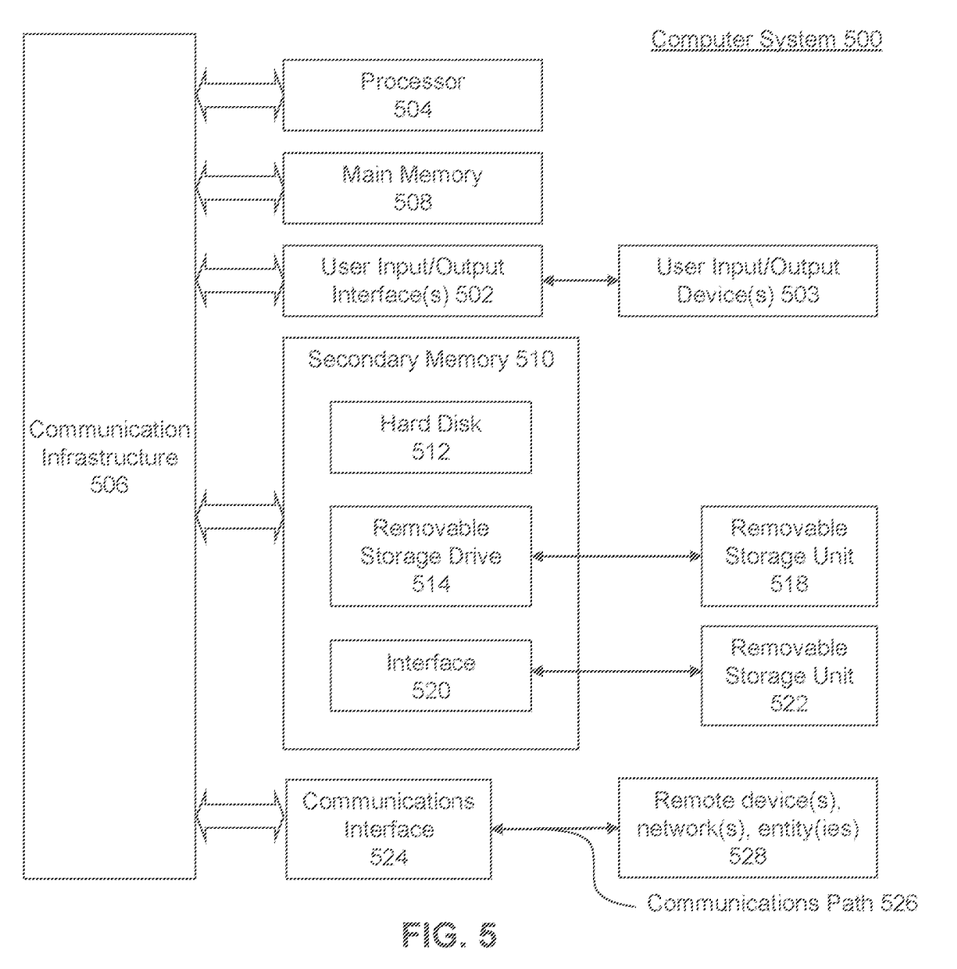
FIG. 5 illustrates an example computer system useful for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
dividing, by at least one computer processor, a video associated with an episode of an episodic content into a plurality of sections;
determining a representation for each of the plurality of sections;
comparing a first representation of a first section of the plurality of sections of the video with a plurality of representations, wherein the plurality of representations are associated with one or more sections of one or more episodes of the episodic content;
determining a plurality of similarity values for the first representation based on the comparison;
determining one or more of the plurality of similarity values that satisfy a condition;
determining a temporal position of the first representation in response to the one or more of the plurality of similarity values satisfying the condition; and
determining a type of the first section of the plurality of sections of the video by comparing the temporal position with a temporal position threshold and further based at least one or more of first region information of a first geographical region where the episodic content is produced or second region information of a second geographical region where the episodic content is being shown,
wherein the type of the first section comprises an opening credits section, an end credits section, a recap section, or a behind-the-scenes section, and
wherein the temporal position threshold depends on at least one or more of the first region information or the second region information.

2. The computer-implemented method of claim 1, wherein the representation comprises an image embedding, an audio embedding, a text embedding, or a combination of two or more of the image embedding, the audio embedding, and the text embedding.

3. The computer-implemented method of claim 1, wherein determining the type of the first section further comprises using one or more temporal positions corresponding to one or more of the plurality of representations associated with the one or more of the plurality of similarity values that satisfy the condition.

4. The computer-implemented method of claim 1, wherein using the temporal position associated with the first representation comprises:
determining that the type of the first section comprises the opening credits section in response to the temporal position being before the first temporal position threshold.

5. The computer-implemented method of claim 1, wherein using the temporal position associated with the first representation comprises:
determining that the type of the first section comprises the end credits section in response to the temporal position being after the first temporal position threshold.

6. The computer-implemented method of claim 1, wherein determining the type of the first section further comprises:
using a text detection method to determine text within the first section of the plurality of sections of the video; and
using the determined text to determine that the type of the first section comprises the end credits section.

7. The computer-implemented method of claim 1, wherein determining the type of the first section further comprises:
using production information associated with the episodic content to determine the type of the first section.

8. The computer-implemented method of claim 1, wherein determining one or more of the plurality of similarity values that satisfy the condition comprises:
comparing the plurality of similarity values with a second threshold; and
determining that the one or more of the plurality of similarity values are greater than the second threshold.

9. The computer-implemented method of claim 1, wherein determining the representation, comparing the first representation with the plurality of representations, determining the plurality of similarity values, and determining the one or more of the plurality of similarity values satisfying the condition are part of an unsupervised machine learning model.

10. The computer-implemented method of claim 1, further comprising:
determining two or more sections of the plurality of sections of the video that have similarity values that satisfy the condition;
determining a number of the two or more sections; and
in response to the number of the two or more sections satisfying a second threshold, using temporal positions associated with the two or more sections to determine a type of the two or more sections of the plurality of sections of the video.

11. A system, comprising:
one or more memories; and
at least one processor each coupled to at least one of the memories and configured to perform operations comprising:
dividing a video associated with an episode of an episodic content into a plurality of sections;
determining a representation for each of the plurality of sections;
comparing a first representation of a first section of the plurality of sections of the video with a plurality of representations, wherein the plurality of representations are associated with one or more sections of one or more episodes of the episodic content;
determining a plurality of similarity values for the first representation based on the comparison;

determining one or more of the plurality of similarity values that satisfy a condition;

determining a temporal position of the first representation in response to the one or more of the plurality of similarity values satisfying the condition; and determining a type of the first section of the plurality of sections of the video by comparing the temporal position with a temporal position threshold and further based at least one or more of first region information of a first geographical region where the episodic content is produced or second region information of a second geographical region where the episodic content is being shown, wherein the type of the first section comprises an opening credits section, an end credits section, a recap section, or a behind-the-scenes section, wherein the temporal position threshold depends on at least one or more of the first region information or the second region information.

12. The system of claim 11, wherein:

the representation comprises an image embedding, an audio embedding, a text embedding, or a combination of two or more of the image embedding, the audio embedding, and the text embedding; and determining the type of the first section further comprises using one or more temporal positions corresponding to one or more of the plurality of representations associated with the one or more of the plurality of similarity values that satisfy the condition.

13. The system of claim 11, wherein using the temporal position associated with the first representation comprises:

determining that the type of the first section comprises the opening credits section in response to the temporal position being before the first temporal position threshold.

14. The system of claim 11, wherein using the temporal position associated with the first representation comprises:

determining that the type of the first section comprises the end credits section in response to the temporal position being after the first temporal position threshold.

15. The system of claim 11, wherein determining the type of the first section further comprises:

using a text detection method to determine text within the first section of the plurality of sections of the video; and using the determined text to determine that the type of the first section comprises the end credits section.

16. The system of claim 11, wherein determining the type of the first section further comprises:

using production information associated with the episodic content to determine the type of the first section.

17. The system of claim 11, wherein determining one or more of the plurality of similarity values that satisfy the condition comprises:

comparing the plurality of similarity values with a second threshold; and determining that the one or more of the plurality of similarity values are greater than the second threshold.

18. The system of claim 11, wherein determining the representation, comparing the first representation with the plurality of representations, determining the plurality of similarity values, and determining the one or more of the plurality of similarity values satisfying the condition are part of an unsupervised machine learning model.

19. A non-transitory computer-readable medium having instructions stored thereon that, when executed by at least one computing device, cause the at least one computing device to perform operations comprising:

dividing a video associated with an episode of an episodic content into a plurality of sections;

determining a representation for each of the plurality of sections;

comparing a first representation of a first section of the plurality of sections of the video with a plurality of representations, wherein the plurality of representations are associated with one or more sections of one or more episodes of the episodic content;

determining a plurality of similarity values for the first representation based on the comparison;

determining one or more of the plurality of similarity values that satisfy a condition;

determining a temporal position of the first representation in response to the one or more of the plurality of similarity values satisfying the condition; and determining a type of the first section of the plurality of sections of the video by comparing the temporal position with a temporal position threshold and further based at least one or more of first region information of a first geographical region where the episodic content is produced or second region information of a second geographical region where the episodic content is being shown, wherein the type of the first section comprises an opening credits section, an end credits section, a recap section, or a behind-the-scenes section, and wherein the temporal position threshold depends on at least one or more of the first region information or the second region information.

20. The non-transitory computer-readable medium of claim 19, wherein using the temporal position associated with the first representation comprises:

comparing the temporal position with the temporal position threshold and a second temporal position threshold;

determining that the type of the first section comprises the opening credits section in response to the temporal position being before the temporal position threshold; and determining that the type of the first section comprises the end credits section in response to the temporal position being after the second temporal position threshold.

\* \* \* \* \*